(12) United States Patent
Abbas

(10) Patent No.: US 8,760,472 B2
(45) Date of Patent: Jun. 24, 2014

(54) PIXEL TRANSFORMS

(75) Inventor: Greg B. Abbas, Los Angeles, CA (US)

(73) Assignee: Apple Inc., Cupertino, CA (US)

(*) Notice: Subject to any disclaimer, the term of this patent is extended or adjusted under 35 U.S.C. 154(b) by 1018 days.

(21) Appl. No.: 12/060,854

(22) Filed: Apr. 1, 2008

(65) Prior Publication Data

US 2009/0244081 A1 Oct. 1, 2009

(51) Int. Cl.
*G09G 5/00* (2006.01)
*G06T 15/10* (2011.01)
*G06T 15/20* (2011.01)

(52) U.S. Cl.
USPC .......................... 345/644; 345/619; 345/427

(58) Field of Classification Search
USPC .................................. 345/426, 644
See application file for complete search history.

(56) References Cited

U.S. PATENT DOCUMENTS

| | | | | |
|---|---|---|---|---|
| 4,751,660 A * | 6/1988 | Hedley | | 345/427 |
| 4,953,107 A * | 8/1990 | Hedley et al. | | 345/422 |
| 5,848,199 A * | 12/1998 | Naqvi | | 382/276 |
| 5,848,201 A * | 12/1998 | Kajiwara | | 382/296 |
| 5,977,977 A * | 11/1999 | Kajiya et al. | | 345/418 |
| 6,252,608 B1 | 6/2001 | Snyder et al. | | 345/473 |
| 6,326,964 B1 * | 12/2001 | Snyder et al. | | 345/419 |
| 6,804,415 B2 * | 10/2004 | Van Overveld et al. | | 382/293 |
| 6,940,518 B2 | 9/2005 | Minner et al. | | |
| 7,133,041 B2 * | 11/2006 | Kaufman et al. | | 345/419 |
| 7,290,216 B1 * | 10/2007 | Kawahara et al. | | 715/762 |
| 7,425,958 B2 * | 9/2008 | Berger et al. | | 345/427 |
| 7,432,925 B2 * | 10/2008 | D'Amora | | 345/419 |
| 7,466,315 B2 * | 12/2008 | Beda et al. | | 345/440 |
| 7,471,291 B2 * | 12/2008 | Kaufman et al. | | 345/424 |
| 7,471,849 B2 * | 12/2008 | Peterson | | 382/275 |
| 7,712,106 B2 * | 5/2010 | Miller et al. | | 719/310 |
| 2003/0038798 A1 * | 2/2003 | Besl et al. | | 345/420 |
| 2003/0065668 A1 * | 4/2003 | Sowizral et al. | | 707/100 |
| 2004/0174378 A1 * | 9/2004 | Deering | | 345/611 |
| 2004/0189667 A1 * | 9/2004 | Beda et al. | | 345/619 |
| 2005/0140694 A1 * | 6/2005 | Subramanian et al. | | 345/619 |
| 2005/0243085 A1 * | 11/2005 | Schechter et al. | | 345/419 |
| 2006/0274070 A1 * | 12/2006 | Herman et al. | | 345/474 |
| 2006/0282865 A1 * | 12/2006 | Ito et al. | | 725/100 |
| 2007/0262995 A1 | 11/2007 | Tran | | |
| 2008/0034292 A1 * | 2/2008 | Brunner et al. | | 715/700 |

FOREIGN PATENT DOCUMENTS

EP 0702832 3/1996
WO WO 2009/128227 10/2009

* cited by examiner

*Primary Examiner* — M Good Johnson
(74) *Attorney, Agent, or Firm* — Robert C. Kowert; Meyertons, Hood, Kivlin, Kowert & Goetzel, P.C.

(57) ABSTRACT

Some embodiments of the invention provide a method for performing a set of operations on an object defined in an image coordinate system to produce a representation of the image defined in a pixel coordinate system. The set of operations include one or more perspective transform operations. The method embeds at least one these perspective transform operations within a pixel transform matrix. The method then uses the pixel transform matrix to produce pixel data in the pixel coordinate system for the object.

23 Claims, 18 Drawing Sheets

PIXEL TRANSFORMS

FIELD OF THE INVENTION

The invention is directed towards rendering images. Specifically, the invention is directed towards using pixel transforms to render images.

BACKGROUND OF THE INVENTION

Today, many different image editing applications exist that allow a user to create and edit images. Several of these image editing applications provide tools to manipulate objects (e.g., shapes, vectors, raster images) within a scene.

A number of different problems can occur when such objects are rendered to produce an output image. One such rendering problem occurs when a series of different operations are performed on an object. For instance, when an object is first rendered at a coarse resolution and then sampled to a finer resolution, the rendered object may lack detail or display noticeable aliasing artifacts.

To further complicate the rendering process, a series of perspective spatial operations on an object may be combined with other image processing operations. For instance, a series of perspective spatial operations (e.g., scale, rotate, etc.) may be combined with a filter operation. The sequence of these operations might cause artifacts, e.g., when the object has to be first rendered first in order to run the filter and subsequently resampled in order to perform the remaining perspective spatial operations.

Therefore, there is a need for a rendering method that can render objects without incurring artifacts. There is also a need for a rendering method that can perform a series of different image processing operations on the objects and still produce high quality results.

SUMMARY OF THE INVENTION

Some embodiments of the invention provide a method for performing a set of operations on an object defined in an image coordinate system to produce pixel data in a pixel coordinate system. The object can be any image for which the pixel data has to be generated through the series of operations. For instance, the object can be a shape that has to be rendered or a raster image that has to be sampled. The set of operations include one or more perspective transform operations, which, in some embodiments, are any image processing operation that can be defined by a perspective matrix (e.g., 3×3 2D matrix, 4×4 3D matrix).

The method embeds one or more of the perspective spatial transform operations within a pixel transform matrix, and then uses the pixel transform matrix to produce the pixel data for the object. In some embodiments, the method (1) uses the pixel transform matrix to define a coordinate system from the object's coordinate system, and then (2) uses the defined coordinate system to produce pixel data for the object.

The method of some embodiments initially defines a render graph that represents the sequence of operations for rendering the object. Some embodiments include a node in the render graph for each operation, and order these nodes in a sequence that matches the sequence of operations. The method then defines a pixel transform matrix and an image array (e.g., a rectangular pixel grid, also called a raster image) at the output of each node. Some embodiments specify the pixel transform matrix at the output of the last node as a known pixel transform matrix, such as an identity matrix. The method then traverses up the render graph to populate the pixel transform matrix at the output of each node, followed by a traversal down the render graph to populate the image array at the output of each node. The image array at the output of the final node represents the rendered pixel data.

Some embodiments implement a pixel transform matrix as a modifier that an image consumer provides in a request that it issues to an image provider. However, instead of describing the bounds of the grid of pixels that it would like the image provider to render, the pixel transform matrix describes the placement of those pixels. This is advantageous because, in a digital signal processing sense, pixels are image samples that do not necessary have to be in a center of each square on an integer grid. An alternate set of sample locations can be devised and described using the pixel transform matrix. Hense, the pixel transform matrix transforms an image coordinate space (i.e., coordinate system that an image object is initially defined in) into an output pixel coordinate system (i.e., coordinate system where the requested pixels do lie at the center of each grid square).

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details.

I. Overview

When producing rendered pixel data in a pixel coordinate system (i.e., pixel space) for an object defined in an image coordinate system (i.e., image space), some embodiments embed one or more perspective spatial transform operations in a pixel transform matrix and use the pixel transform matrix to produce the rendered pixel data. Some embodiments (1) use the pixel transform matrix to define a coordinate system from the object's coordinate system, and then (2) use the defined coordinate system to produce pixel data for the object.

A perspective spatial transform operation is an operation that can be represented by n-by-n matrix that specifies a perspective spatial transform. Examples of perspective spatial transform operations include rotation, translation, skewing, perspective projections, scaling, etc. Perspective spatial transform operations are different from other non-perspective image processing operations that do not specify a perspective transform for performing on an image. Examples of non-perspective image processing operations include color mapping operations (e.g., color correction, color balance, channel swapping) and different types of filters (e.g., twirl, blur, distortion, border, glow, etc.).

A pixel transform matrix defines a relationship between two coordinate systems (e.g., an image coordinate system and a pixel coordinate system). The pixel transform matrix defines this relationship by specifying the spatial orientation (e.g., placement, location) and/or granularity of one coordinate system with respect to another coordinate system.

Figure 1:
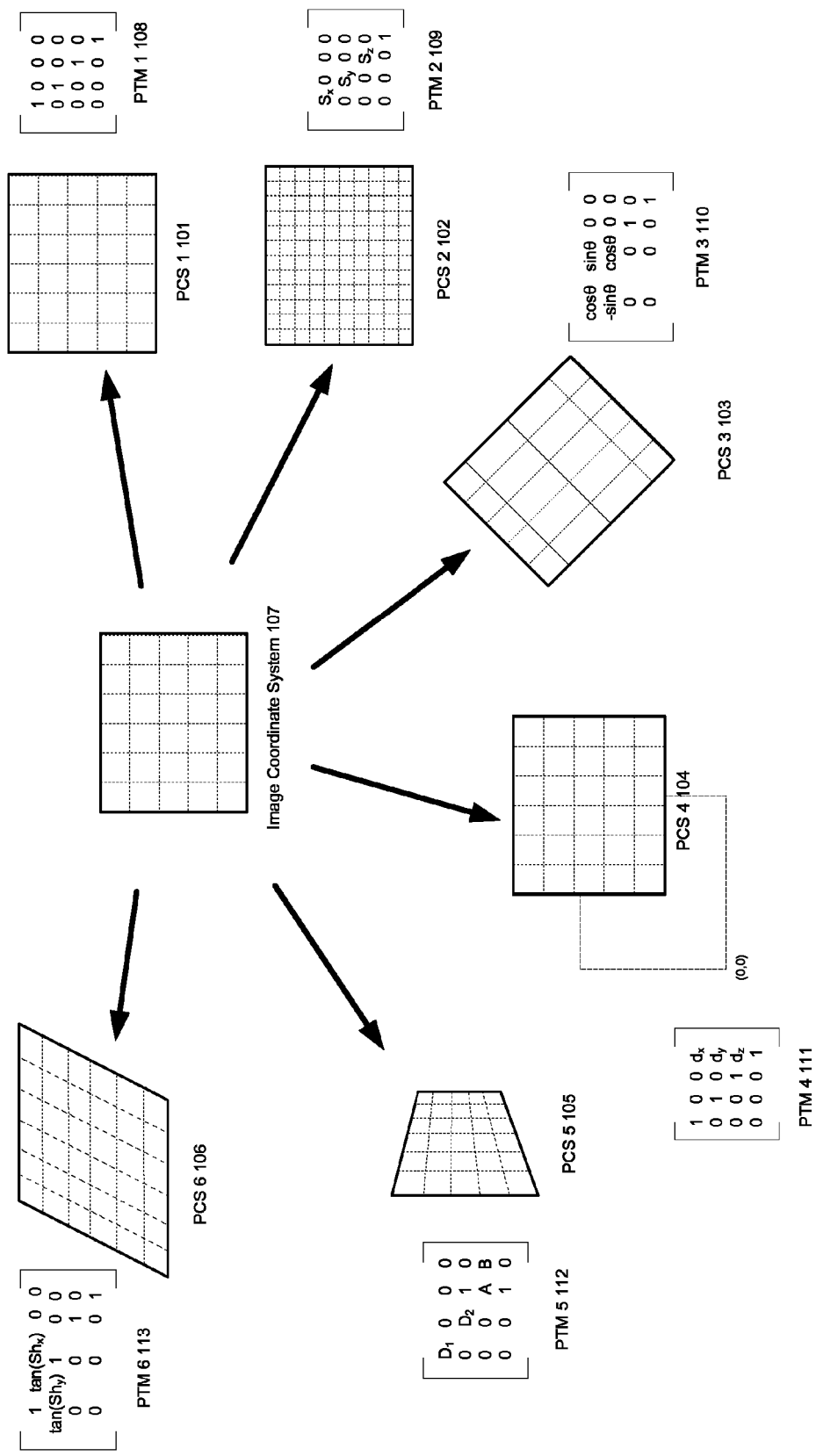
FIG. 1 provides several illustrative examples of perspective spatial operations that can be defined within a pixel transform matrix.

FIG. 1 illustrates several examples of different pixel transform matrices that define such relationships. Specifically, this figure illustrates: (1) an identity matrix 108 that defines the image space 107 to be identical to the pixel space 101; (2) a scale matrix 109 that defines the granularity or the scale of the pixel space 102 with respect to the image space 107; (3) a rotate matrix 110 that defines the rotation of the pixel space 103; (4) a translation matrix 111 that defines the location of the pixel space 104; (5) a projection matrix 112 that defines the perspective projection of the pixel space 105; and (6) a shear matrix 113 that defines the shearing of the pixel space 106.

Figure 2:
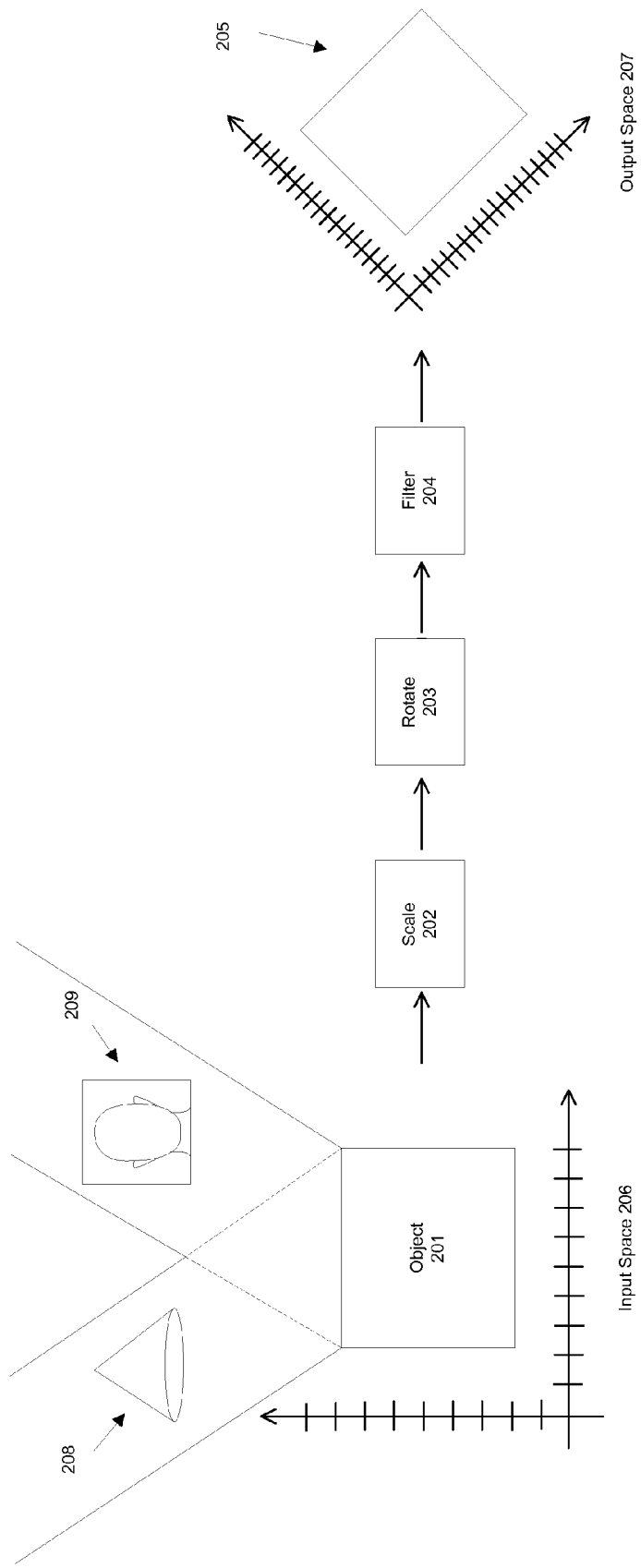
FIGS. 2-3 present an example that conceptually illustrates the use of the pixel transform matrix in some embodiments.
Figure 3:
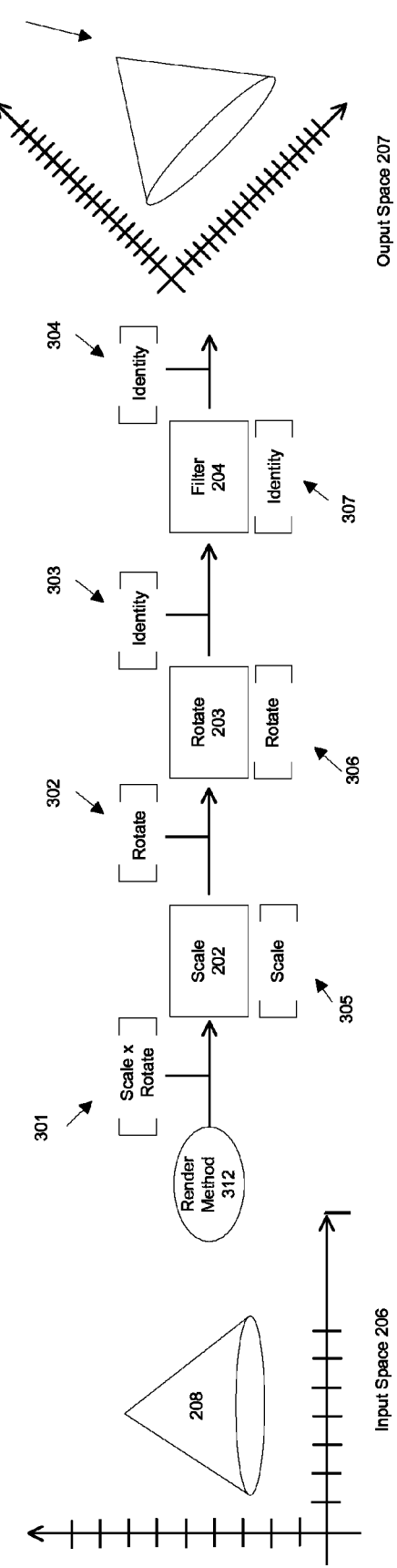

FIGS. 2-3 present an example that conceptually illustrates the use of the pixel transform matrix in some embodiments. FIG. 2 illustrates performing a series of operations 202-204 on an object 201 defined in an input space 206 to produce the pixel data 205 in the output space 207. In this example, the output space is rotated and scaled up with respect to the input space. Also, the object 201 can be any item for which the pixel data 205 has to be generated through the series of operations. For instance, the object can be a shape 208 that has to be rendered, a raster image 209 that has to be sampled, or any other type of graphical item.

As shown in FIG. 2, the series of image processing operations 202-204 are performed on the object 201. These image processing operations include several perspective spatial transform operations and a non-perspective image processing operation. In this example, the perspective spatial transform operations are a scale operation 202 and a rotate operation 203, and the non-perspective image processing operations is a filter operation 204 that maps one color onto another.

As a series of different operations are performed on an object, the rendering process may result in data loss and rendering artifacts in the output image. Some embodiments account for this realization by moving the perspective spatial transform operations up a rendering pipeline to the point where the pixel data is generated or close the point where it is generated. These embodiments move the perspective spatial transform operations by embedding the operations in one or more pixel transform matrices that are used to generate the pixel data.

FIG. 3 illustrates an example of how pixel transform matrices are defined and moved up a rendering pipeline to generate pixel data for the case where the object 201 illustrated in FIG. 2 is a shape 208 generated by a render method 312. At the output of the rendering pipeline, some embodiments define a known pixel transform matrix. For instance, some embodiments define the pixel transform matrix at the output of the rendering pipeline to be an identity matrix because such a matrix would be useful for producing an output image at a particular resolution for use (e.g., for display or storage). Other embodiments, however, might define the pixel transform matrix at the output of the rendering pipeline to be any other known matrix.

After identifying the identity matrix 304 in FIG. 3, the pixel transform matrix at the output of the rotate operation 203 is computed as the pixel transform matrix at the output of the filter operation 204 times the transform matrix 307 of the filter operation 204. Some embodiments define the transform matrix of the filter operation 204 as an identity matrix, even though of a non-perspective transform operation cannot really be described in terms of a perspective transform matrix. Hence, the transform matrix at the output of the rotate operation 203 is an identity matrix 303.

Next, the pixel transform matrix at the output of the scale operation 202 is computed as the pixel transform matrix 303 at the output of the rotate operation 203 times the transform matrix 306 of the rotate operation 203. As the transform matrix 306 specifies a rotate operation while the pixel transform matrix 303 is an identity matrix, the result of this multiplication is a pixel transform matrix 302 that has the rotate operation embedded in it.

Finally, the pixel transform matrix at the output of the render operation 312 is computed as the pixel transform matrix 302 at the output of the scale operation 202 times the transform matrix 305 of the scale operation 202. As the transform matrix 305 specifies a scale operation while the pixel transform matrix 302 specifies a rotate operation, the result of this multiplication is a pixel transform matrix 301 that has the rotate and scale operations embedded in it.

Once perspective spatial transform operations are moved up a rendering pipeline, some embodiments produce the pixel data according to one or more pixel transform matrices and pass the pixel data down the rendering pipeline to produce the output image. For instance, in FIG. 3, the render method 312 generates the pixel data by using the pixel transform matrix 301, which factors both the scale and rotate operations. The pixel data is then passed unchanged through the scale and rotate operations 202 and 203 as these operations were accounted for in the pixel transform matrix 301. The pixel data is then filtered according to the filter operation 204 to produce the final pixel data 305 in the output space 207.

In addition to moving perspective spatial transform operations up a rendering pipeline, some embodiments further account for the different perspective and non-perspective operations by inserting additional image processing operations into the rendering pipeline. As will be described below, these image processing operations include resampling operations that operate on generated pixel data and image transformation operations that operate on the objects in the image space.

Several more detailed embodiments of the invention are described in the sections below. Section II describes the rendering process according to some embodiments. Next, Section III describes several more detailed examples of defining pixel transform matrices and generating pixel data. Section IV describes using pixel transforms to perform field rendering according to some embodiments. Section V describes a rendering engine of a content editing application in which some embodiments are implemented. Lastly, Section VI describes a computer system with which some embodiments of the invention are implemented.

II. Rendering Process

Figure 4:
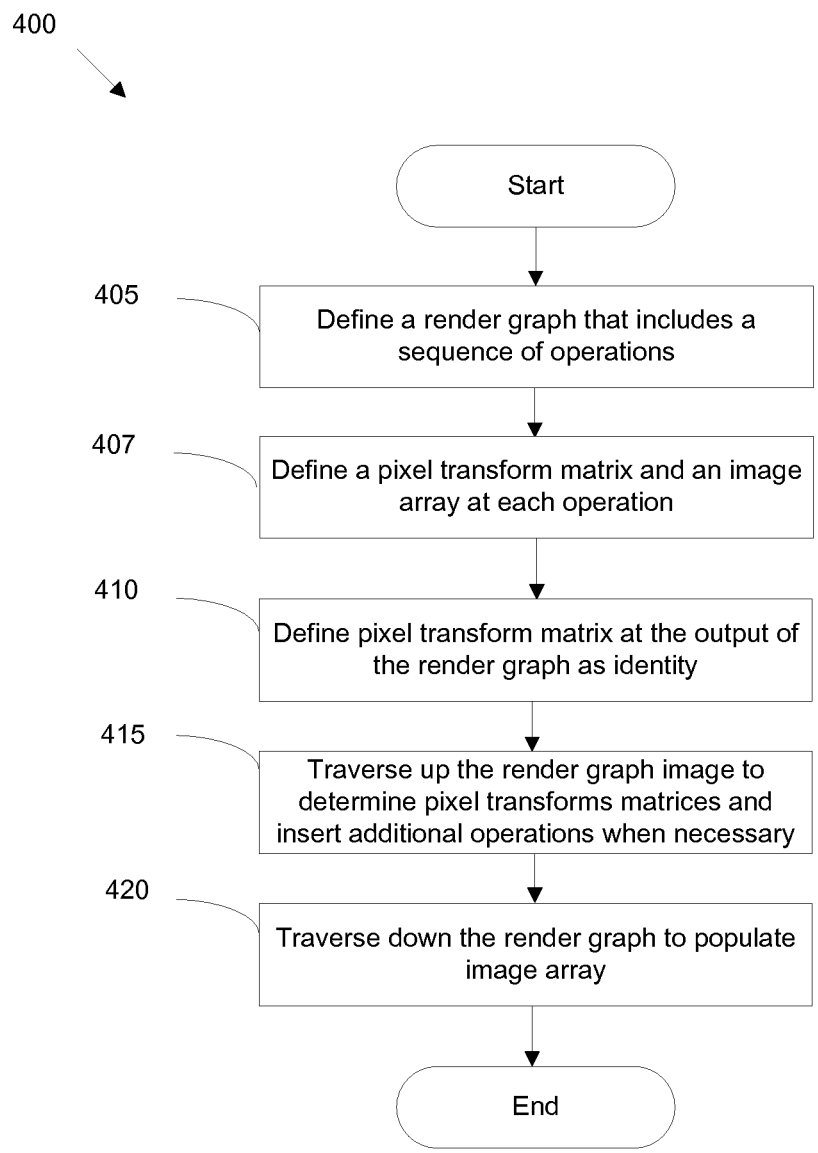
FIG. 4 conceptually illustrates how some embodiments use pixel transform matrices to render an object.

FIG. 4 conceptually illustrates how some embodiments use pixel transform matrices to render an object. In some embodiments, this method is performed by a rendering engine of a content editing application (e.g., video editing application, image editing application, etc.) when the application needs to render a scene or an image (e.g., for display or storage). In some embodiments, this process is part of a larger process that is performed by the rendering engine to render content (e.g., performed to render a scene with many objects and may image processing operations). In some embodiments, the rendering engine renders several scenes to produce media content (e.g., animation, video, motion graphics, etc.).

Figure 5:
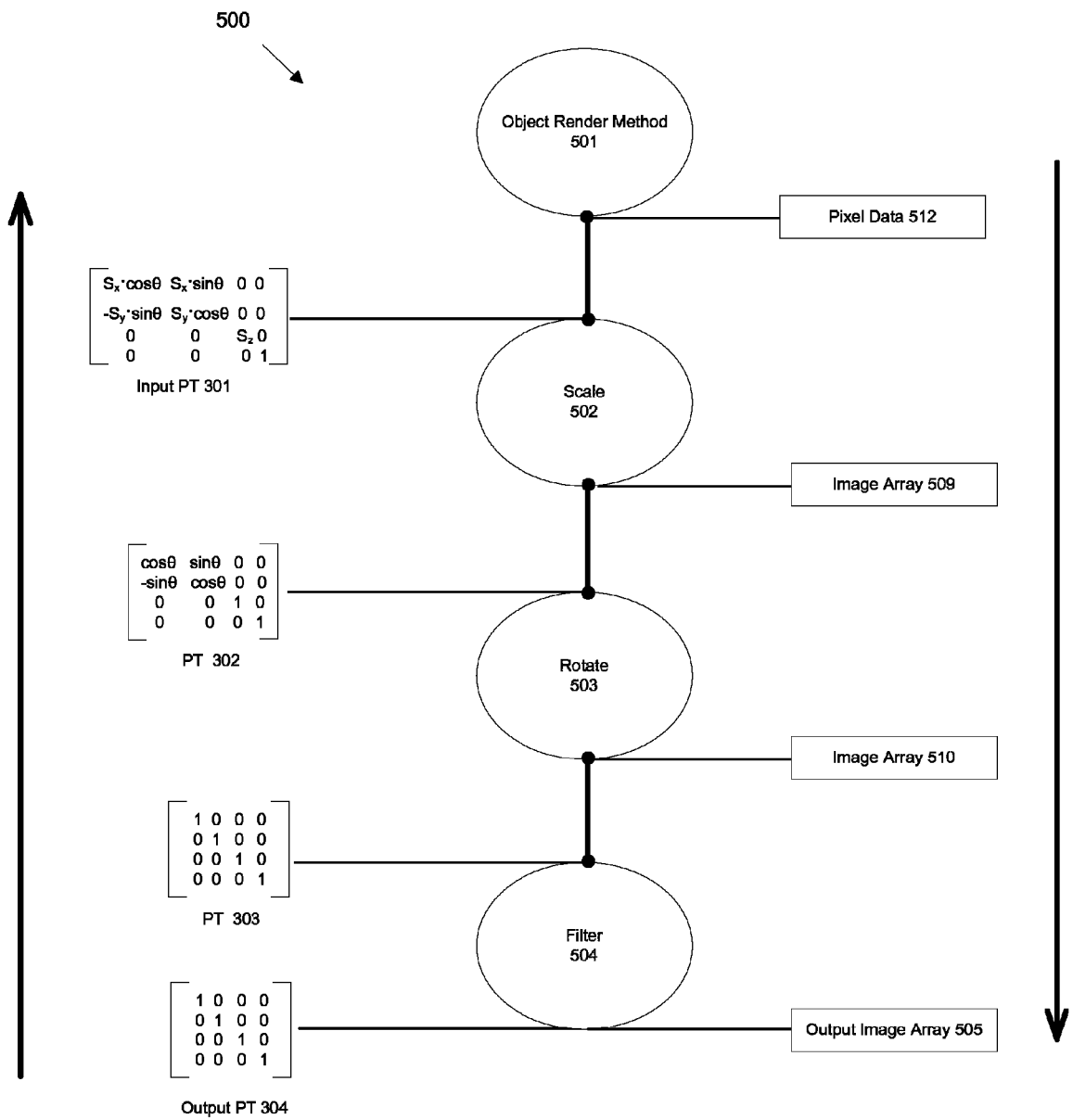
FIG. 5 illustrates an example of traversing up a render graph to identify pixel transform matrices and traversing down the render graph to populate image arrays.

The process 400 first defines (at 405) a render graph that includes a sequence of nodes. Each of the nodes in the render graph corresponds to a particular image processing operation and the sequence of the nodes corresponds to the order in which the operations are performed. For instance, FIG. 5 illustrates a render graph 500 for rendering the shape 208 of FIG. 2. This render graph is defined to include (1) the render node 501 that corresponds to the render operation 312, (2) the scale node 502 that corresponds to the scale operation 202, (3) the rotate node 503 that corresponds to the rotate operation 203, and (4) the filter node 504 that corresponds to the filter operation 204. The sequence of these nodes in the graph follows the sequence of their corresponding operations.

Next, the process 400 defines (at 407) a pixel transform matrix and an image array (e.g., a rectangular pixel grid, also called a raster image) at the output of each node. The process then populates (at 410 and 415) pixel transform matrices by traversing up the render graph, and populates (at 420) the image arrays by traversing down the render graph.

Specifically, at 410, the process defines the pixel transform matrix at the output as a known matrix. As mentioned above, some embodiments define the output pixel transform as the identity matrix in order to specify that the output image is at the resolution that it is intended for use. In other words, when a user submits a request to render an image by a particular resolution (e.g., 1920×1080, 640×480), the user might wish that the output image be at that requested resolution. If the output pixel transform is not identity but has a scale of ½ both vertically and horizontally, then the output image will be at ½ the resolution that was requested. Therefore, the identity pixel transform matrix at the output ensures that the user receives the rendered image at the requested resolution and not some approximation. This is illustrated in FIG. 5 as the output pixel transform 508 of the filter node 504 is defined as identity.

The process then traverses up (at 415) the render graph to identify pixel transform matrices. As mentioned above, the pixel transform matrix at the input of one particular node equals the pixel transform matrix at the output of the particular node times the transform matrix that specifies the perspective transform operation (if any) performed by the particular node; in case when the node does not perform a perspective transform operation, some embodiments define the transform matrix of that node as an identity matrix. For instance, in FIG. 5, the pixel transform matrices are successively moved up the render graph until the pixel transform matrix 301 is defined at the output of the render node to include both the rotate and scale operations.

After identifying the pixel transform matrices, the process (at 420) traverses down the render graph in order to populate the image arrays at the output of each node. The final node's output will represent the rendered results (i.e., the final rendered pixel data). For instance, in the example illustrated in FIG. 3, the pixel transform matrix 301 (which factors both the scale and rotate operations) is passed as an attribute to the render method 312 when this method is called. Based on this pixel transform matrix, the render method generates pixel data 512, which is initially passed unchanged through the scale and rotate operations 502 and 503 as these operations were accounted for in the pixel transform matrix 301. The pixel data is then filtered according to the filter operation 504 to produce the final pixel data 505 in the output space 207.

Although though the process 400 has been described by reference to 405-420, one of ordinary skill in the art would understand that the process may not be performed in the same order as illustrated in FIG. 4 or may include other operations as part of the rendering process. For example, as described above, this process may be part of a larger process that is performed by a rendering engine to render a scene with many objects and may image processing operations.

III. Rendering Examples

Figure 6:
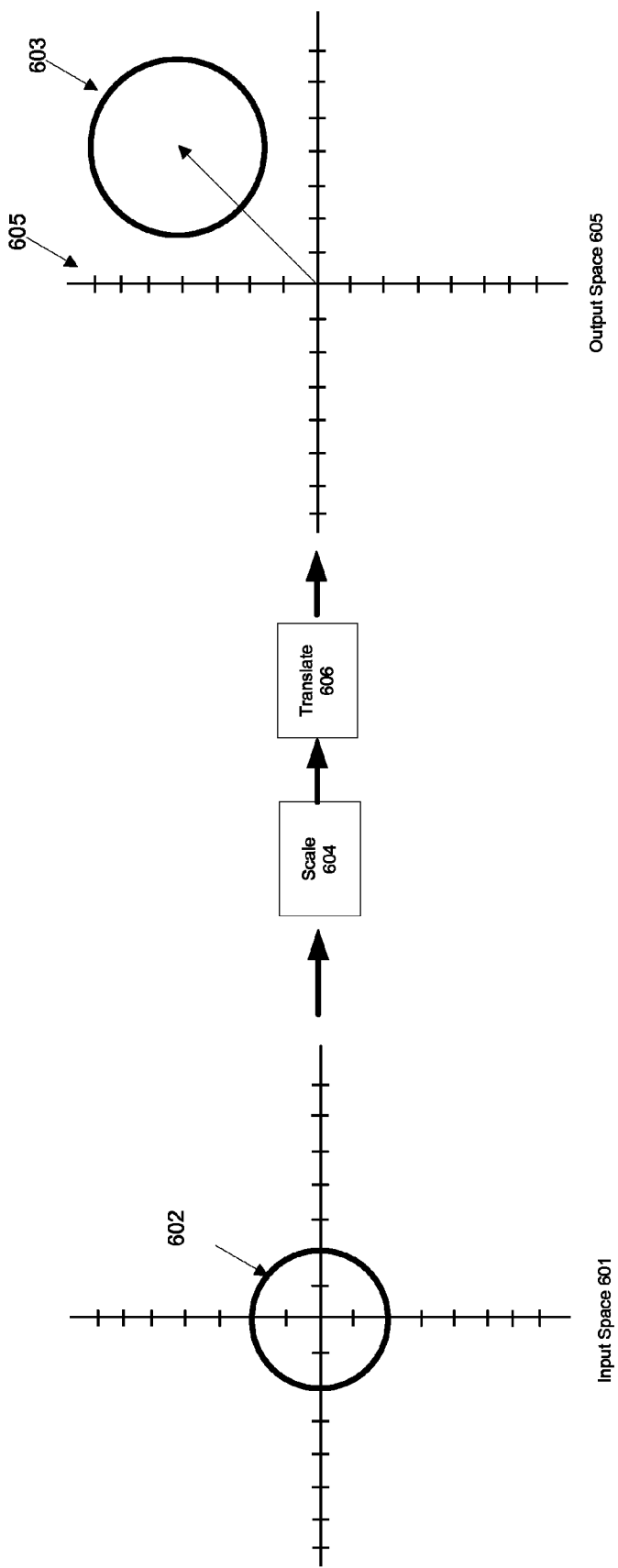
FIG. 6 provides an illustrative example of producing pixel data for an object according to a pixel transform matrix.
Figure 7:
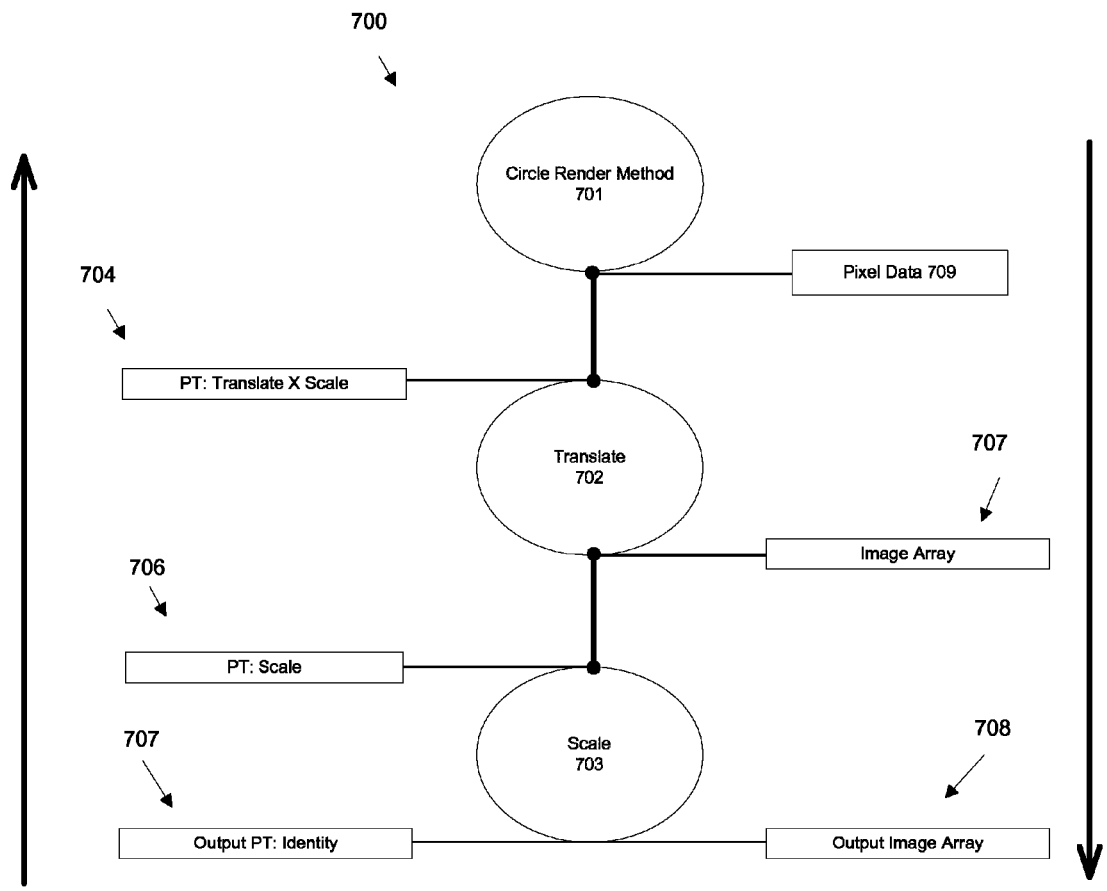
FIG. 7 illustrates an example of performing a series of perspective spatial transform operations on a shape.
Figure 8:
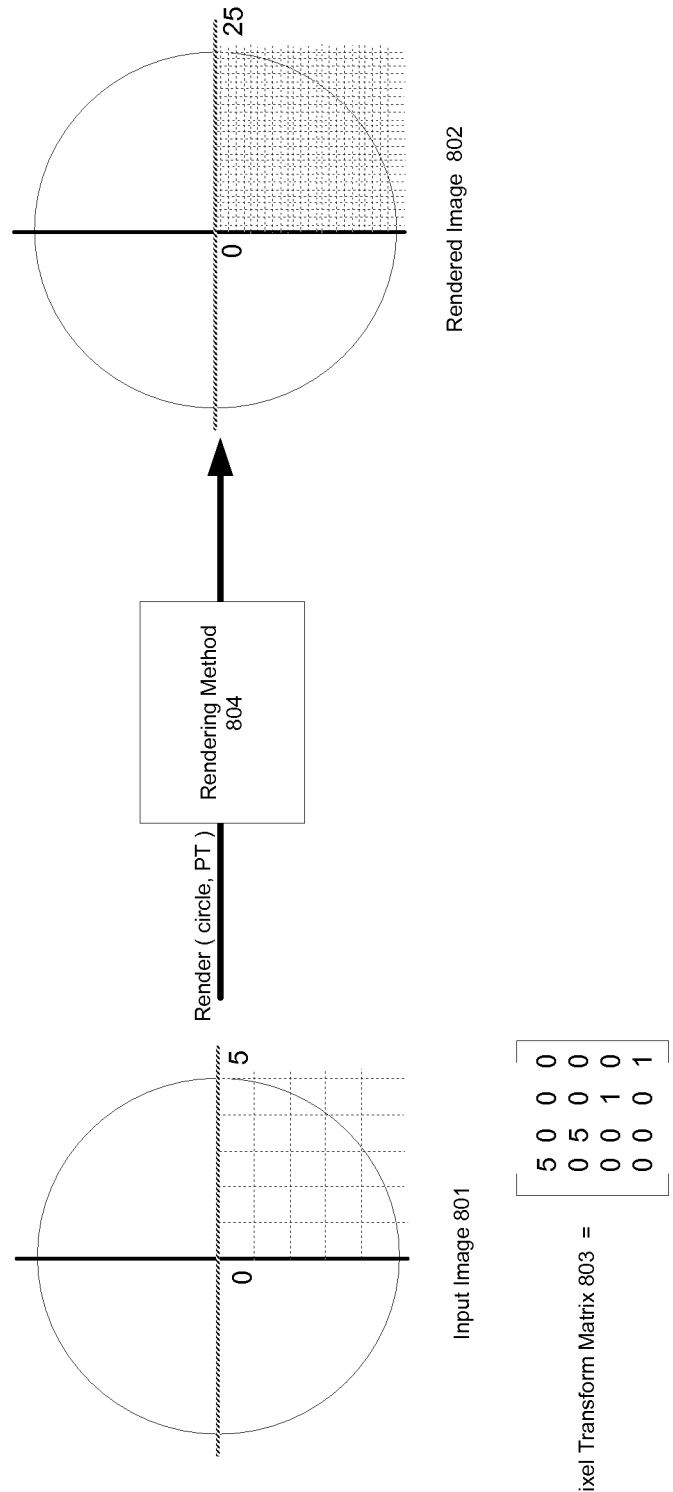
FIG. 8 illustrates an example of a rendering method that produces pixel data based on a pixel transform matrix.

To better explain the rendering process, several additional examples will now be described by reference to FIGS. 6-12. Specifically, FIGS. 6-8 illustrate an example of performing a series of different perspective spatial operations on a shape. FIGS. 9-10 illustrate an example of performing a combination of perspective and filtering operations on a shape where the initial image processing operation is the filtering operation. Lastly, FIGS. 11-12 illustrate an example of performing a perspective spatial transform operation on a raster image.

A. Multiple Perspective Spatial Operations on a Shape

FIG. 6 illustrate an example of performing a sequence of perspective spatial transform operations on a shape. A shape in some embodiments is a vector object that has to be rendered to produce its associated pixel data. In this example, the shape is a circle 602. Also, in this example, the sequence of operations includes a translate operation 604 and a scale operation 606. As shown in FIG. 6, the circle shape 602 is defined in a source input space 601, while the rendered circle 603 is defined in a destination output space 605.

To produce the rendered circle, some embodiments define a render graph 700 illustrated in FIG. 7. This rendered graph includes (1) a circle render node 701 that represent the render method for rendering the circle, (2) a translate node 702 for the translate operation, and (3) a scale node 703 for the scale operation. Once the render graph is defined, some embodiments define the pixel transform matrix at the output of the scale node to be an identity matrix, and then traverse up the render graph 700 to identify the remaining pixel transform matrices.

As mentioned above, the pixel transform matrix at the input of a particular node equals the pixel transform matrix at the output of the particular node times the transform matrix that specifies the perspective transform operation performed by the particular node. For instance, in FIG. 7, the pixel transform matrix 704 at the output of the circle render node 701 is computed as the pixel transform matrix 706 at the output of the translate operation times the transform matrix of the translate node 702. As the translate node 702 represents a translate operation while the pixel transform matrix 706 specifies a scale operation, the result of this multiplication is the pixel transform matrix 704 that has both the translate and scale operations embedded in it.

Once perspective spatial transform operations are moved up the render graph, some embodiments call the render method and pass the pixel transform matrix 704 with that call. As further described below by reference to FIG. 8, the rendering method 601 produces pixel data based on the received pixel transform matrix 704. Once the pixel data is generated, it is passed down the render graph to be processed as necessary, and the final node's output will represent the rendered results (i.e., the final rendered pixel data). For instance, in FIG. 7, the pixel data 709 is past down unchanged through image array 707, and populated in the output image array 708.

To illustrate how a render method bases its operation on a passed pixel transform matrix, FIG. 8 presents an example of a render method that renders a circle based on a pixel transform matrix 803 that specifies a 5× scale operation. This figure illustrates an input image 801, an input pixel transform matrix 803, a render method 804, and pixel data 802 that is defined in a destination output space. The input image 801 is a circle vector having a radius of 5, while the input pixel transform 803 specifies that the width and height of the pixel grid is 5 times as granular as that of the input image.

The render method receives 804 both the input image 801 and the pixel transform matrix 803, and produces the pixel data 802 in accordance with the pixel transform matrix. In some embodiments, the render method uses the pixel transform matrix to define a coordinate system that is 5 times as granular as the coordinate system of the image. For each pixel in the newly defined coordinate system the render method then produces a pixel data value for the circle. In other words, the render method has taken a coarsely defined circle and scaled it so as to produce a representation of the circle with a relatively fine resolution.

As the images are generated according to the input pixel transforms, image processing operations that once required resampling can be eliminated through the use of the pixel transforms. Such resampling operations that can be eliminated include perspective and spatial resampling operations, and any other image processing operations or transformations that can be embedded within an n-by-n perspective matrix (e.g., 2D matrix, 3D matrix).

By eliminating resampling operations, the quality of the output image may also be improved. For instance, when an image is first rendered at a coarse resolution and then sampled to a finer resolution, the output image may lack detail or may produce noticeable aliasing artifacts. However, when an input image is rendered using a pixel transform matrix specifying a particular resolution, the rendered image will contain as much detail as the input image can provide at that requested resolution.

In some cases, the elimination of the resampling operation not only increases the quality of the output image but also increases the performance of the rendering process. For example, several different perspective resampling operations can all be defined within a single pixel transformation matrix. Therefore, instead of performing several operations, a single operation using the pixel transform can produce a requested image with improved rendering time as less image processing is required.

B. Perspective and Filter Operations on a Shape

In addition to moving perspective spatial transform operations up a rendering pipeline, some embodiments further account for perspective spatial and non-perspective operations by inserting additional image processing operations into a render graph. These image processing operations include operations that operate on generated pixel data and transformation operations that operate on objects in the image spaces.

Figure 9B:
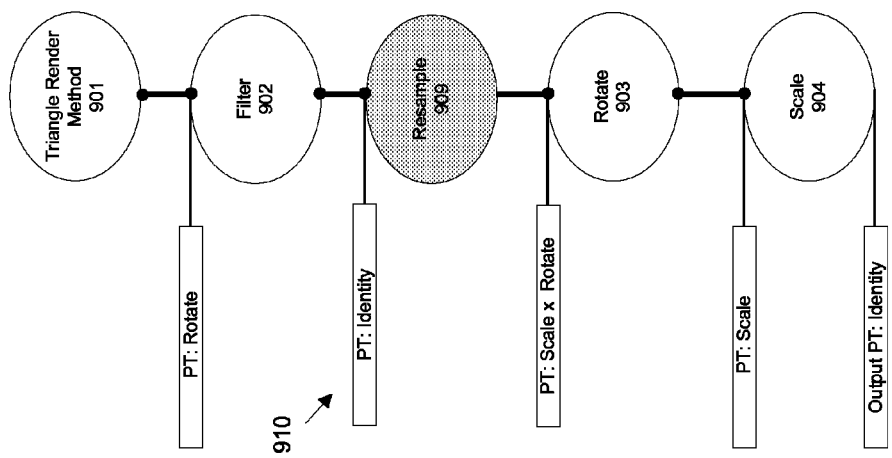
FIGS. 9A-9B provide an illustrative example of inserting additional processing nodes into a render graph for an object.
Figure 9A:
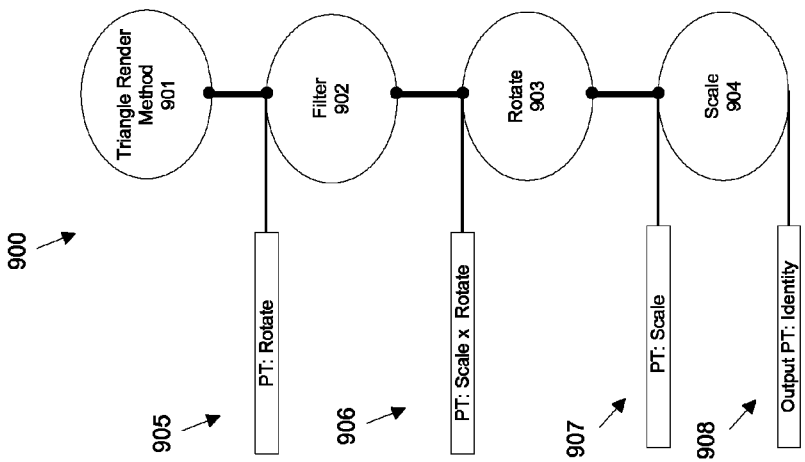
Figure 10:
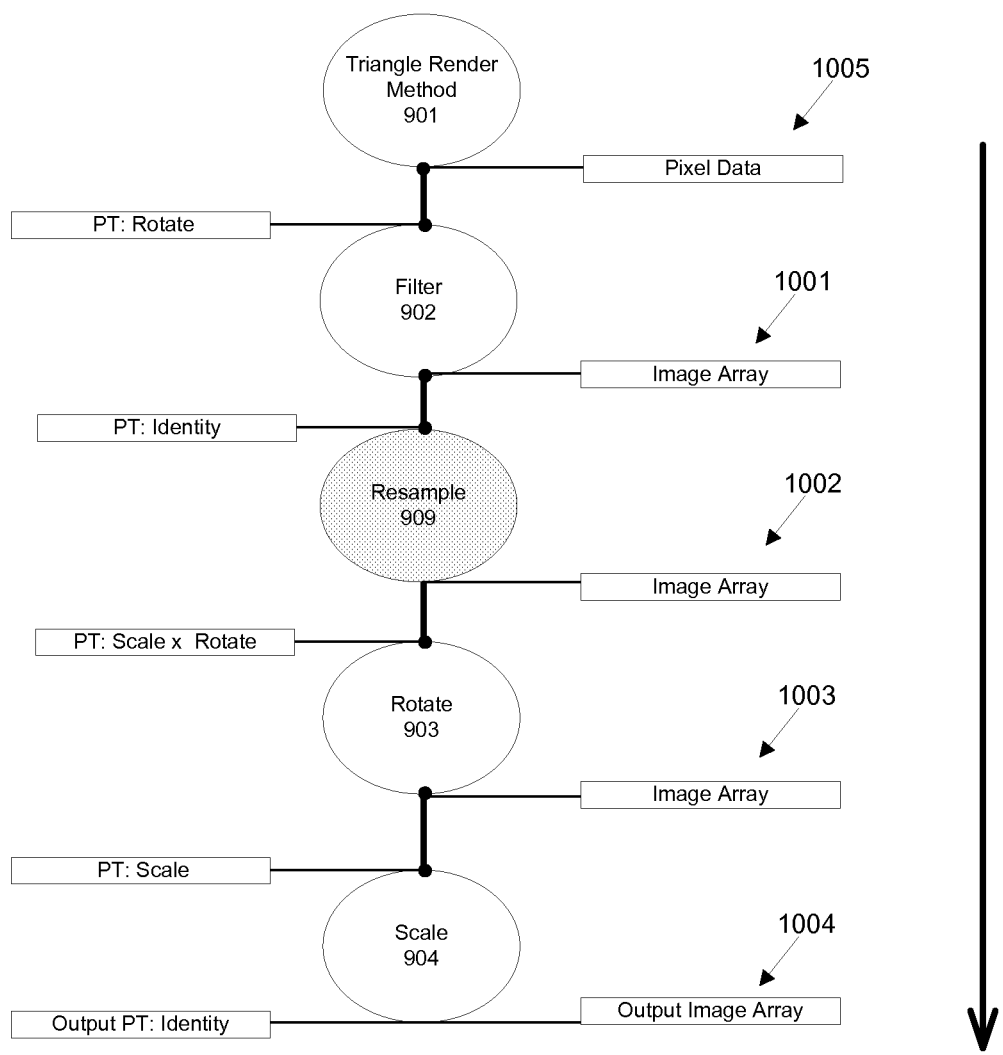
FIG. 10 provides an illustrative example of producing pixel data for an object.

FIGS. 9A-9B provide an illustrative example of adding a processing node to a render graph for a triangle shape. The sequence of operations that are performed on the triangle shape are (1) a filter operation, (2) rotate operation, and (3) a scale operation. Thus, in FIG. 9A, the render graph 900 includes a filter node 902 for the filter operation, a rotate node 903 for the rotate operation, and a scale node 904 for the scale operation. Similar to the previous examples, the output pixel transform 908 is defined as identity. Also, the pixel transform 906, which is at the output of the filter node 902, combines the rotation and scale operations.

As discussed above, there are different categories or types of filters (e.g., blurring, adding borders, sharpening, glowing, etc). Some of these filters may support one perspective spatial transform operation and not support other perspective spatial transform operation, or may support a perspective transform operation up to only a certain set of values. For instance, a filter operation might have a size restriction and can only accept a scale operation up to only a particular size.

In FIG. 9A, pixel transform 905 at the output of the triangle shape node 901 is different from pixel transform 906 because the filter node 902 represents a filter operation that supports a rotate operation but does not support a scale operation. Hence, the pixel transform 905 at the output of the triangle shape node 901 includes only the rotate operation and does not include the scale operation. However, as the scale operation is not accounted for by the pixel transform 905, FIG. 1 shows a resample node that is added to the render graph 900. This resample node 909 represents a perspective resampling operation that samples pixel data to produce the scaled image. The pixel transform 910 at the input of the resample node 909 is defined as identity as the node represents resampling operation that does not perform a perspective spatial transform operation.

In some embodiments, instead of a node that operate on pixel data, a transformation that redefines the image in the source image space may also be inserted into the render graph. For instance, when a particular filter is unable to perform its filtering operation, a transformation operation that modifies the image in its source image space may be inserted into the render graph. Depending on a particular filter, the image may be scaled, rotated, sheared, translated, etc.

Some filters are pixel independent in that the output of every pixel depends only on the corresponding input pixel and do not depend on the coordinate values. Brightness and contrast adjustment are examples such filters. For those filters, some embodiments allow these filters to operate the same without regard to pixel transform matrices as they are commutative with transforms. In some cases, such filters can be moved up or down a scene or render graph as their order in the render graph does not affect the output image.

After traversing up the render graph to identify pixel transform matrices, some embodiments traverse down the render graph to populate image arrays. FIG. 10 illustrates traversing down the render graph for the triangle shape of FIGS. 9A-9B. Initially, pixel data 1005 that contain a rotated triangle is generated according to input pixel transform matrix 905. The pixel data is then filtered and populated into image array 1001. The pixel data is then passed to the resample node 909 for processing. The resample node 909 performs the perspective resampling operations and populates image array 1002. The resampled pixel data is then passed down the render graph past the rotate node 903 and the scale node 904 (as both of these operations were accounted for by the filter node 902 and the resample node 909), and populated in the output image array 1004.

C. Perspective Operation on a Raster Image

Figure 11A:
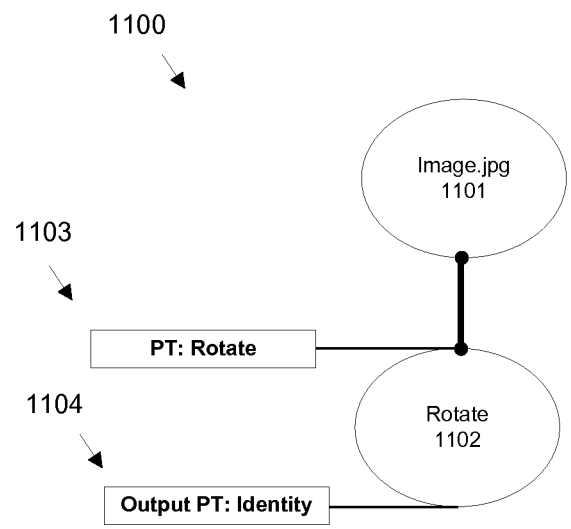
FIGS. 11A-11B provide an illustrative example of inserting additional processing nodes into a render graph for a raster image.
Figure 11B:
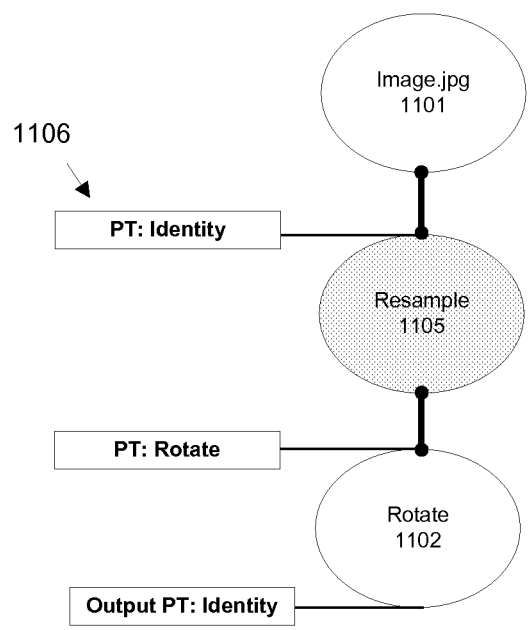
Figure 12:
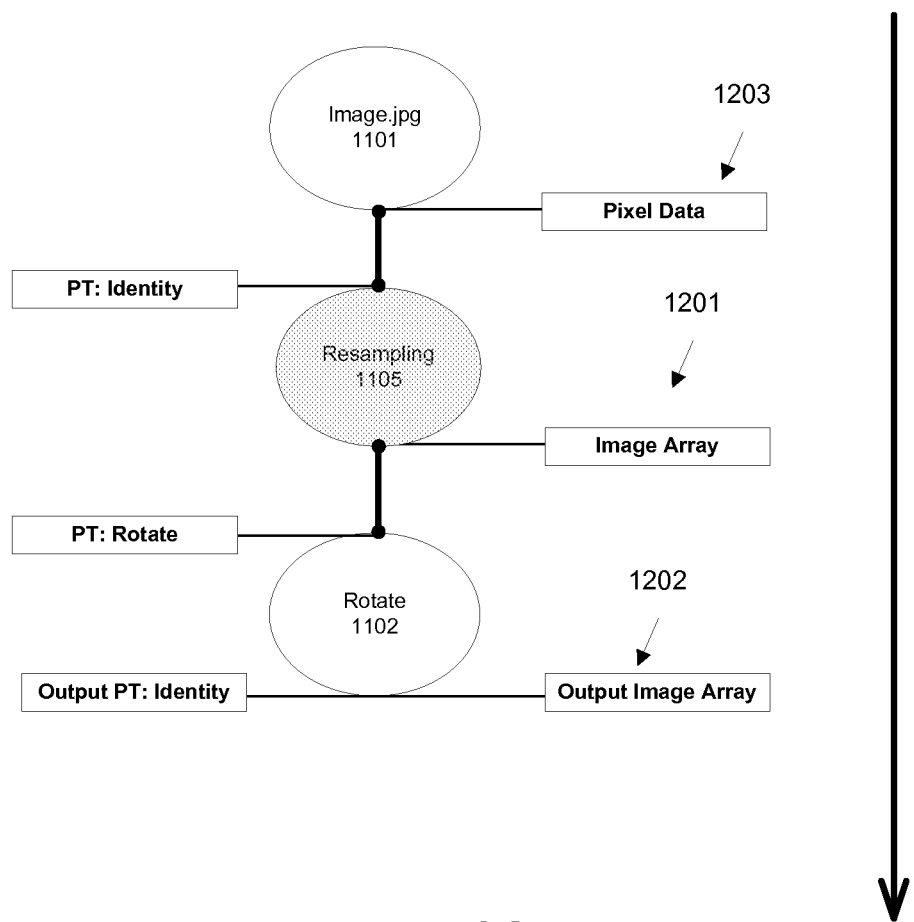
FIG. 12 provides an illustrative example of producing pixel data for a raster image.

FIGS. 11A-11B provide an illustrative example of adding a processing node to a render graph for a raster image. These figures include a render graph 1100 with an image node 1101 that represents a raster image and a rotate node 1102 that represent a rotate operation performed on the raster image. Similar to the previous examples, the output pixel transform 1102 of the render graph 1100 is defined as identity, and pixel transform 1103 at the input of the rotate node 1102 is defined as rotate because the rotate operation represents a perspective transform operation.

Although pixel transform 1103 specifies the rotate operations, the raster image node 1101 represents an object that cannot be rendered according to any other pixel transform matrix other than an identity matrix. In such cases, when an object does not support a particular pixel transform matrix or is not supported by a rendering engine, some embodiments of the invention will insert one or more additional operations into a render graph to produce the output image. For instance, in FIG. 11B, a resample node 1105 is added to the render graph 1100. This resample node 1105 represents a perspective resampling operation that samples pixel data to produce the rotated image. The pixel transform 1106 at the input of the resample node 1105 is defined as identity as the node represents resampling operation that does not perform a perspective spatial transform operation.

FIG. 12 illustrates traversing down the render graph of FIG. 11B. Initially, pixel data 1203 from the raster image is sampled and populated into image array 1201. The image array contains a rotated representation of the raster image. The sampled pixel data is then passed down the render graph 1100 unchanged through image array 1201 and populated in the output image array 1202.

IV. Field Rendering

Some embodiments utilize pixel transform matrices to perform field rendering for a media presentation (e.g., animation, video, motion graphics, etc.). In field rendering, objects (e.g., scenes, frames, images) in a media project are rendered into an upper field or a lower field. The objects are rendered into these separate fields because it allows for smooth motion playback on certain monitors (e.g., television monitors). One reason for this is because by splitting objects into multiple fields, the objects are sampled at twice the frame rate.

Figure 13:
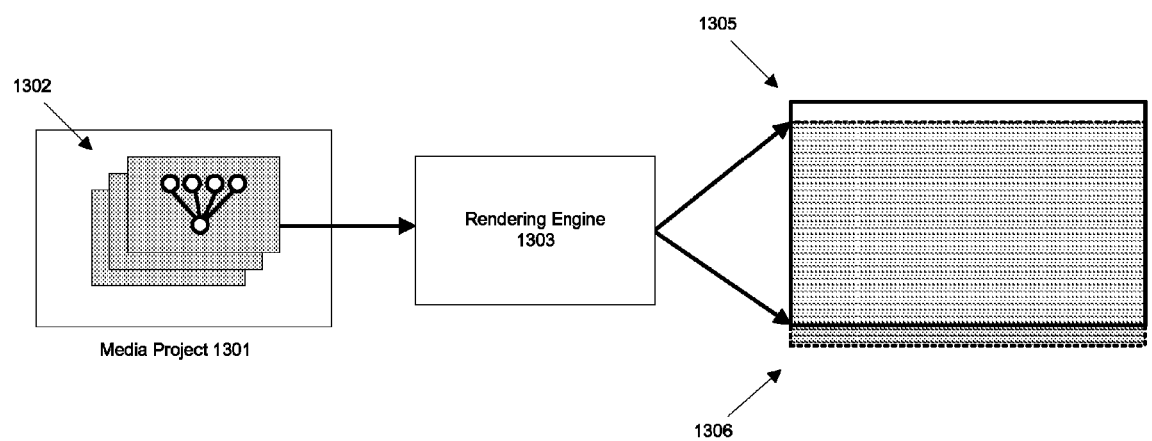
FIG. 13 provides a conceptual illustration of a rendering engine that performs field rendering.

FIG. 13 provides a conceptual illustration of a rendering engine that performs field rendering for a media project. As shown, media project 1301 include a set of scenes 1302, where each scene includes a set of frame and a frame corresponds to a particular scene at an instance in time. In some embodiments, a scene may include one or more image objects, text objects, video objects, mask objects, drawing objects (e.g., brush strokes), light objects, effect objects (e.g., smoke effects, blur effects, filter effects), etc. The scene may also include one or more camera objects that define one or more views of the scene. In FIG. 13, a rendering engine 1303 receives a set of scenes 1302 in a media project and renders the set of scenes. In some embodiment, the rendering engine renders each frame in each scene to an upper field 1305 or a lower field 1306. In some embodiments, the rendering engine 1303 also receives a field rendering information (e.g., field order, interlacing options, etc).

Some embodiments define each field as a destination pixel grid and utilize a particular pixel transform to relate a frame (e.g., image space) to the destination pixel grid. Specifically, a first pixel transform matrix and a second pixel transform matrix is used to relate objects to an upper field or a lower field. For instance, in FIG. 14, a lower field pixel transform 1402 is used for the lower field 1306, and an upper field pixel transform 1401 is used for the upper field 1305.

In some embodiments, a particular field is defined to be twice as coarse vertically as it is horizontally. For instance, in FIG. 14, the y-to-y coefficient of both upper and lower pixel transform matrices 1401 and 1402 are specified as ½, as a particular field has ½ the vertical resolution of a full frame.

Figure 14:
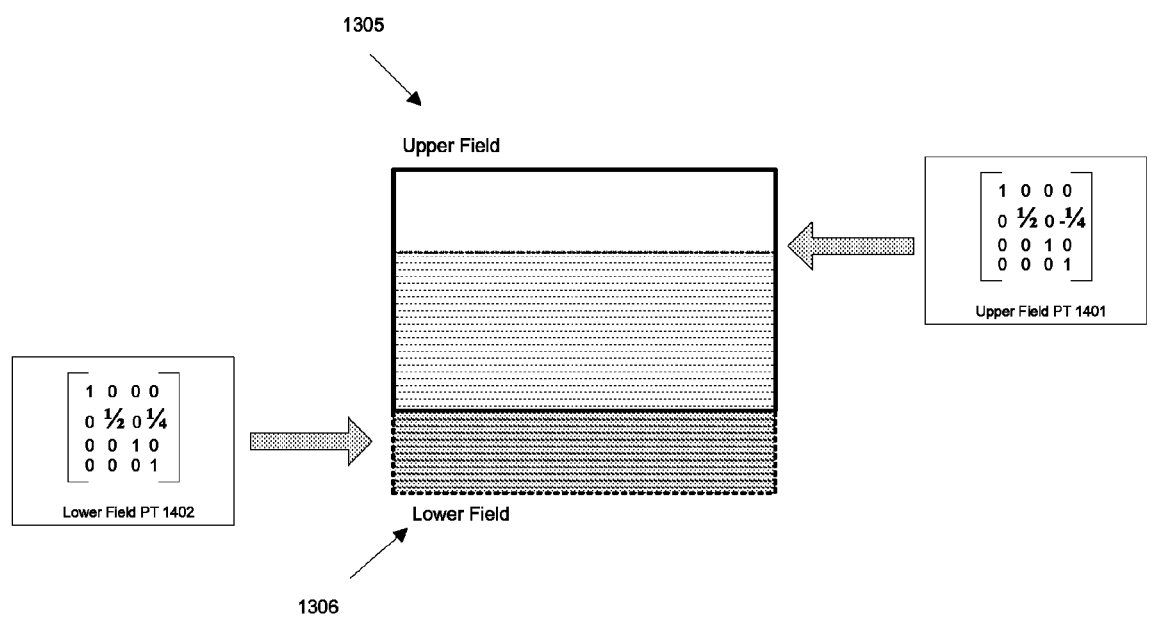
FIG. 14 provides an illustrative example of rendering upper and lower fields using pixel transform matrices.

While the y-to-y coefficient of the pixel transform matrices are equal, the translation coefficient are different. This is because the upper and lower fields are translated in different direction. In some embodiments, every pixels are located at the center of one of the unit squares on a pixel grid, and thus have fractional coordinates. For instance, for a bitmap that draws from 0 to 10 on the x-axis and 0 to 5 on the y-axis, the lower-left pixel is at (0.5, 0.5) and the upper-right pixel is at (9.5, 4.5). In the case of a particular field, the lower-left pixel in the field bitmap has to correspond to the correct pixel in a full frame. For the lower field, this means that the pixel transform matrix should map (0.5, 0.5) to (0.5, 0.5). However, by scaling the field, the pixel transform matrix maps this point in the image to (0.5, 0.25). As shown in FIG. 14, this is resolved by adding a 0.25 translation to the y coordinate of the pixel transform matrix 1402 of the lower field 1306. The upper field 1305 is translated similarly to the lower fields. However, by scaling the upper field, the pixel transform matrix maps this point in the image to (0.5, 0.75). Thus, for the upper fields, 0.25 is subtracted from the y coordinate of the pixel transform matrix.

Figure 15:
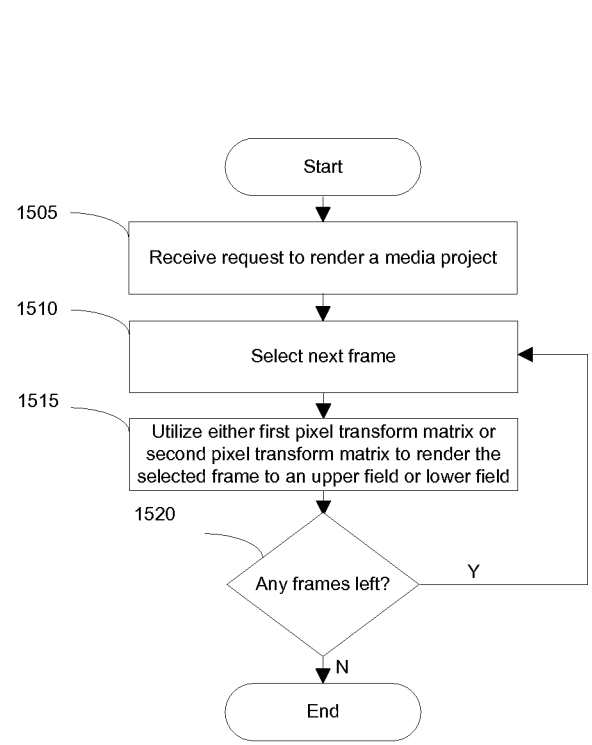
FIG. 15 illustrates a process that some embodiments utilize to perform field rendering.

FIG. 15 illustrates a process 1500 that some embodiments utilize to perform field rendering. In some embodiments, this process is performed by a rendering engine that receives a set of frames and renders it to a media presentation (e.g., animation, video, motion graphics). The process (at 1505) first receives a request to render a set of frames. In some embodiments, the set of frames are from a media project and includes one or more objects. Next, the process (at 1510) selects a particular frame. The process then (at 1515) utilizes either a first pixel transform matrix or a second pixel transform matrix to render the selected frame to an upper field or a lower field. Some embodiments render the upper field first before the lower field when it allows for smoother playback. The process then (at 1520) determines whether any frames are remaining that have not been rendered. When there is one or more frames remaining, the process selects the next frame and repeats the same operations as described above; otherwise, the process ends.

V. Content Editing Application

Figure 16:
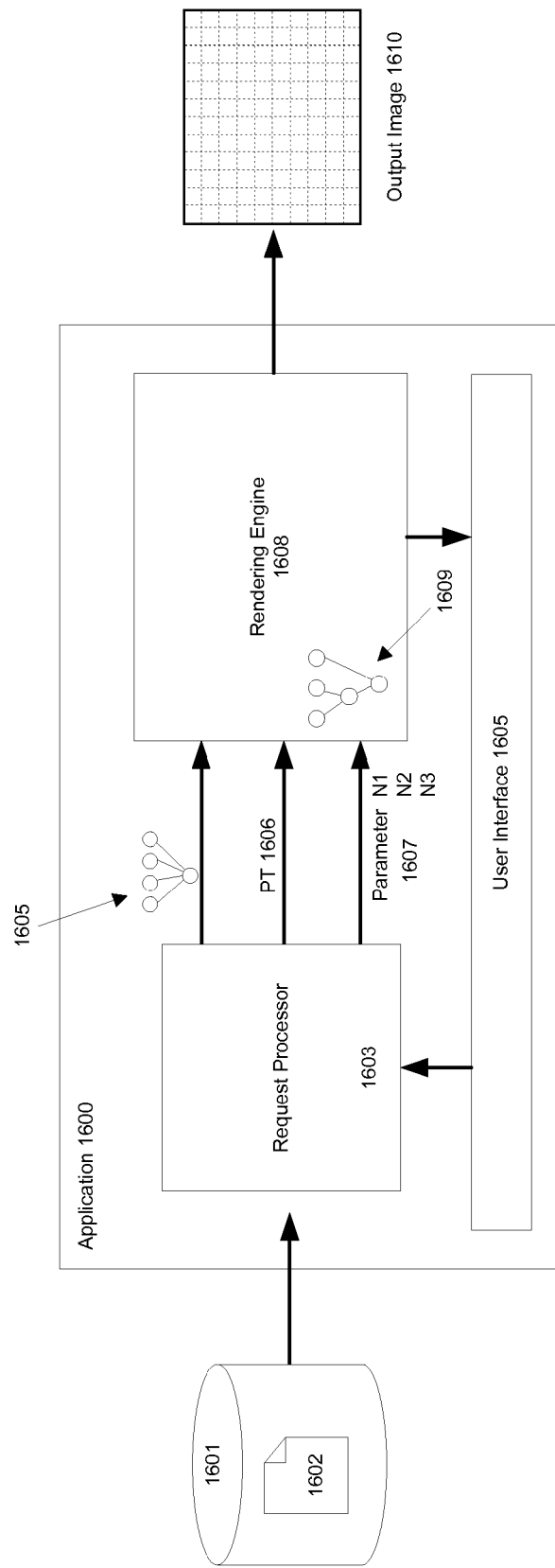
FIG. 16 shows a content editing application that utilizes pixel transform matrices to render images according to some embodiments.

FIG. 16 shows a content editing application 1600 that utilizes pixel transform matrices to render images according to some embodiments. The application provides a rendering engine 1608 that (1) creates a render graph 1609 for a scene, (2) defines pixel transform matrices and corresponding image arrays for the render graph, and (3) traverses the render graph to render the scene. Specifically, some embodiments of the rendering engine traverses up the render graph to populate pixel transform matrices and traverses down the render graph to render the scene.

Some embodiments of the rendering engine receive as input a scene graph 1605 and create the render graph 1609. In some embodiments, the scene graph is provided to the render graph with one or more parameters 1607. These parameters 1607 might include (1) a region of interest that defines a particular area of a scene, (2) one or more cameras that define the view of the scene (e.g., the user's view), and/or (3) a time that corresponds to a particular time when the scene is presented, etc. In some embodiments, the rendering engine receives as parameter a pixel transform matrix 1606, which allows the rendering engine to define the output pixel transform of the render graph (e.g., as identity to ensure that the output image 1610 is at a resolution that it is intended for use).

In some embodiments, a render request processor 1603 creates the scene graph from a project file 1602 stored on a storage 1601. The rendering engine receives as input the scene graph 1605 and the parameters 1607 and produces a render graph in accord with the input. After creating the render graph, some embodiments of the rendering engine define pixel transform matrices and corresponding image arrays for the render graph 1609. The rendering engine then traverses up the render graph to populate pixel transform matrices and traverses down the render graph to populate image arrays in order to render the scene. The rendered scene is then put in a queue for display or storage. For instance, in FIG. 16, the rendered scene is provided to a user interface 1605 so that a user can interact (e.g., delete, modify) with the objects in the scene.

Figure 17:
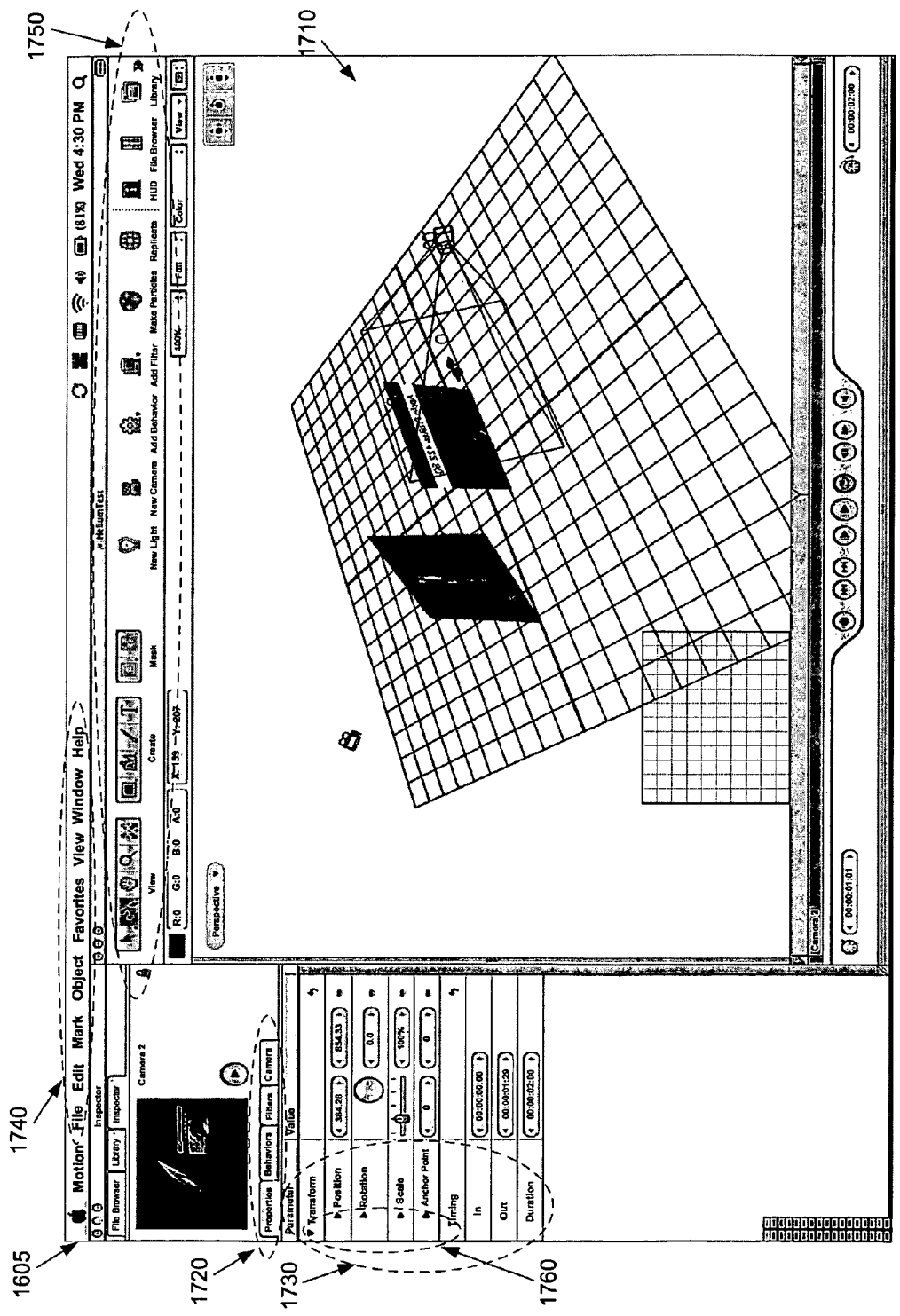
FIG. 17 shows a user interface for a content editing application in accordance with some embodiments of the invention.

FIG. 17 shows the user interface 1605 of a content editing application 1600 in accordance with some embodiments of the invention. The user interface 1605 provides (1) a main workspace window 1710 or canvas for displaying and manipulating objects, (2) a set of selectable tabs 1720 that reveal various tools 1730 for manipulating the objects, (3) a set of various menu controls 1740 for providing file management and object management functionality, and (4) a set of selectable icons 1750 for adding objects to a project and removing objects from the project.

Each of the graphical representations for the objects appearing within the workspace 1710 is fully editable. Users can drag and drop a graphical representation to manipulate a position of an object (e.g., within the 3D space). Users can manipulate an object by clicking its corresponding graphical representation in order to modify attributes of the objects. Users can transform objects using the functions 1730 or icons 1750 of the content editing application 1600. In some embodiments, objects that can be included in the workspace 1710 include image objects, camera objects, text objects, video objects, mask objects, drawing objects (e.g., brush strokes), light objects, effect objects (e.g., smoke effects, blur effects, filter effects), etc.

The set of selectable tabs 1720 provide a means to access data related to object properties, behaviors, filters, etc. Some of the various object manipulating functionality is incorporated within sets of collapsible function menus 1730. Each of the collapsible function menus 1730 contain groups of related functions and parameters for manipulating one or more objects within the workspace 1710. Each function is expandable and collapsible through the selectable user interface items 1760.

The selectable icons 1750 permit users the ability to add, remove, or modify objects. As shown, these objects may include light objects, camera objects. Other objects such as image objects, video objects, etc. can be imported using the "file browser" icon within the selectable icons 1750. Users can import these various objects into the content editing application from a computer readable medium that may include a storage device of the computer system executing the content editing application or other storage devices of other computing devices. Users can also load previously imported objects using the selectable "library" icon within the selectable icons 1750. This icon accesses an object library of the content editing application that in some embodiments is shared by multiple applications of the computer system.

VI. Computer System

Figure 18:
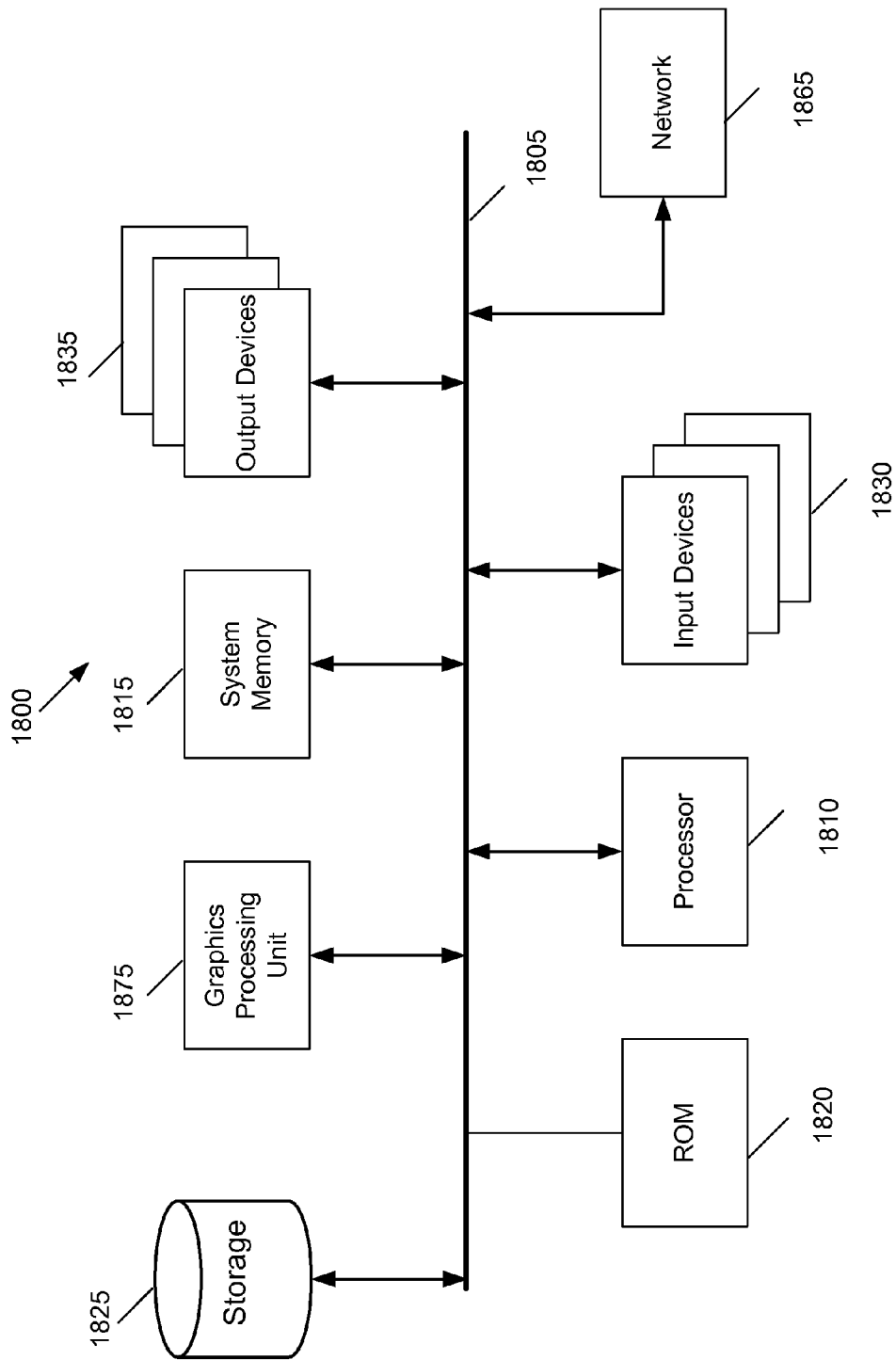
FIG. 18 illustrates a computer system with which some embodiments of the invention are implemented.

FIG. 18 illustrates a computer system with which some embodiments of the invention are implemented. Computer system 1800 includes a bus 1805, a processor 1810, a graphics processing unit (GPU) 1820, a system memory 1825, a read-only memory 1830, a permanent storage device 1835, input devices 1840, and output devices 1845.

The bus 1805 collectively represents all system, peripheral, and chipset buses that communicatively connect the numerous internal devices of the computer system 1800. For instance, the bus 1805 communicatively connects the processor 1810 with the read-only memory 1830, the GPU 1820, the system memory 1825, and the permanent storage device 1835.

From these various memory units, the processor 1810 retrieves instructions to execute and data to process in order to execute the processes of the invention. Some instructions are passed to and executed by the GPU 1820. The GPU 1820 can offload various computations or complement the image processing provided by the processor 1810.

The read-only-memory (ROM) 1830 stores static data and instructions that are needed by the processor 1810 and other modules of the computer system. The permanent storage device 1835, on the other hand, is a read-and-write memory device. This device is a non-volatile memory unit that stores instructions and data even when the computer system 1800 is off. Some embodiments of the invention use a mass-storage device (such as a magnetic or optical disk and its corresponding disk drive) as the permanent storage device 1835.

Other embodiments use a removable storage device (such as a floppy disk or ZIP® disk, and its corresponding disk drive) as the permanent storage device. Like the permanent storage device 1835, the system memory 1825 is a read-and-write memory device. However, unlike storage device 1835, the system memory is a volatile read-and-write memory, such a random access memory. The system memory stores some of the instructions and data that the processor needs at runtime. In some embodiments, the invention's processes are stored in the system memory 1825, the permanent storage device 1835, and/or the read-only memory 1830.

The bus 1805 also connects to the input and output devices 1840 and 1845. The input devices enable the user to communicate information and select commands to the computer system. The input devices 1840 include alphanumeric keyboards and pointing devices. The output devices 1845 display images generated by the computer system. For instance, these devices display a graphical user interface. The output devices include printers and display devices, such as cathode ray tubes (CRT) or liquid crystal displays (LCD).

Finally, as shown in FIG. 18, bus 1805 also couples computer 1800 to a network 1865 through a network adapter (not shown). In this manner, the computer can be a part of a network of computers (such as a local area network ("LAN"), a wide area network ("WAN"), or an Intranet, or a network of networks, such as the internet For example, the computer 1800 may be coupled to a web server (network 1865) so that a web browser executing on the computer 1800 can interact with the web server as a user interacts with a graphical user interface that operates in the web browser.

Any or all components of computer system 1800 may be used in conjunction with the invention. For instance, in some embodiments, the execution of image editing functions can be offloaded to the GPU 1820 where they are executed before the results are passed back into memory or the processor 1810. However, a common limitation of the GPU 1820 is the number of instructions that the GPU 1820 is able to store and process at any given time. Therefore, some embodiments adapt the instructions for implementing the processes 1400 of FIG. 14 and 1500 of FIG. 15 so that these processes fit onto the instruction buffer of the GPU 1820 for execution locally on the GPU 1820. Additionally, some GPU do not contain sufficient processing resources to execute the processes of some embodiments and therefore the processor executes the instructions. One of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. For instance, in some embodiments, instead of a render tree or graph, one or more other data structures containing a sequence of steps may be used to render the composition. These other structures may include other associations between different nodes that may not be represented by a render tree or graph. The examples have discussed application of the various image editing functions to images, but each of the above examples are extensible to apply to other forms of visual media such as video (e.g., motion graphics animation). Also, some of the examples may be executed on a GPU or CPU of a computer system depending on the computing resources available on the computer system or alternatively on any electronic device that is able to view images. Thus, one of ordinary skill in the art would understand that the invention is not to be limited by the foregoing illustrative details, but rather is to be defined by the appended claims.

I claim:

1. For a content editing application, a method of rendering an image for a graphics presentation, said method comprising:
    receiving input for a set of editing operations that modifies at least one of a size, shape, and position of an image in a user-definable scene of the graphics presentation, said image defined in an image coordinate system;
    defining a sequence of operations to be performed on the image based on the set of editing operations, said sequence comprising at least two perspective transform operations;
    embedding at least the two perspective transform operations within a pixel transform matrix that relates the image coordinate system of the image to a pixel coordinate system; and
    using the pixel transform matrix to produce pixel data from the image that is defined in the image coordinate system in order to render the scene of the graphics presentation.

2. The method of claim 1 further comprising embedding at least one other perspective transform operation within said pixel transform matrix.

3. The method of claim 1 further comprising determining that the edit to the image includes a non-perspective transform operation, wherein defining the sequence of operations comprises adding the non-perspective transformation to the sequence based on the determination.

4. The method of claim 1, wherein defining the sequence comprises (i) receiving a scene graph and a set of parameters that are associated with the edit to the image, and (ii) generating, from the scene graph and the set of parameters, a render graph that includes the sequence of operations.

5. The method of claim 1, wherein the sequence of operations comprises a filtering operation that applies an effect to the image, the method further comprising inserting at least one additional image processing operation into the sequence of operations to account for a particular perspective transform operation when the filtering operation cannot be performed with the particular perspective transform operation embedded within the pixel transform matrix.

6. The method of claim 5, wherein the additional image processing operation is inserted in order to perform a sampling operation on the produced pixel data.

7. For a content editing application, a method of rendering an image defined in an image coordinate system, the method comprising:
    receiving input for a set of editing operations to perform on the image, the set of operations comprising a filtering operation that applies an effect to the image, and first and second perspective transform operations that each modifies a shape, position, or size of the image;
    defining, based on the input, a render graph comprising the filtering operation, the first perspective transform operation, and the second different perspective transform operation;
    embedding at least the first perspective transform operation in a pixel transform matrix that relates the image coordinate system of the image to a pixel coordinate system;
    inserting, into the render graph, a resampling operation to account for the second perspective transform operation when the filtering operation cannot be performed on the image with the second perspective transform operation embedded in the pixel transform matrix; and
    rendering the image by (i) producing pixel data using the pixel transform matrix, (ii) performing the filtering operation on the pixel data to apply the effect to the image, and (iii) performing the resampling operation on the output pixel data of the filtering operation when the resampling operation has been inserted into the render graph.

8. The method of claim 7, wherein the pixel coordinate system is a pixel grid that includes a plurality of locations for specifying pixel values, wherein using the pixel transform matrix comprises determining pixel values for a set of locations in the plurality of locations.

9. The method of claim 8, wherein the set of locations is the locations within the pixel grid where the image is displayed.

10. A non-transitory computer readable medium storing a computer program that when executed by at least one processor renders a scene for a graphics presentation, said computer program comprising:
    a set of instructions for receiving input to render the scene for the graphics presentation that includes an image defined in an image coordinate system, said input indicating an output resolution of the scene;
    a set of instructions for defining a render graph specifying a sequence of image processing operations to perform on the image, said sequence comprising a plurality of perspective transform operations;
    a set of instructions for defining a pixel transform matrix at an output of the render graph as an identity matrix to output the scene at the output resolution, the pixel transform matrix relating the image coordinate system of the image to a pixel coordinate system;
    a set of instructions for embedding the plurality of perspective transform operations within the pixel transform matrix by traversing up the render graph; and
    a set of instructions for traversing down the render graph to produce pixel data for the scene, wherein the pixel data is produced at the specified output resolution based on the identify definition of the pixel transform matrix.

11. The non-transitory computer readable medium of claim 10, wherein the scene includes multiples images that is associated with at least one particular pixel transform matrix.

12. The non-transitory computer readable medium of claim 10, wherein the set of image processing operations comprises a perspective spatial transformation operation and a non-perspective spatial transformation operation.

13. The non-transitory computer readable medium of claim 10, wherein the sequence of operations comprises a filtering operation that applies an effect to the image, wherein the computer program further comprises a set of instructions for inserting at least one additional image processing operation into the render graph to account for a particular perspective transform operation when the filtering operation cannot be performed with the particular perspective transform operation embedded within the pixel transform matrix.

14. The non-transitory computer readable medium of claim 13, wherein the additional processing operations is inserted in order to perform a resampling operation.

15. The non-transitory computer readable medium of claim 10, wherein the set of instructions for defining the render graph comprises specifying a location in the sequence of operations for at least one filtering operation that is commutative with the pixel transform matrix, the at least one filtering operation applying one or more effects to the image.

16. The non-transitory computer readable medium of claim 10, wherein the computer program further comprises a set of instructions for generating pixel data for the image using the pixel transform matrix.

17. The non-transitory computer readable medium of claim 10, wherein the set of instructions for traversing the render graph comprises a set of instructions for passing pixel data down the render graph.

18. For a content editing application, a method comprising:
providing a canvas for editing a scene that includes a plurality of objects, the scene associated with a plurality of image processing operations, wherein each object is defined in an object coordinate system; and
providing a rendering engine for rendering the scene by (i) defining a render graph as a sequence of operations to be performed on the plurality of objects in the scene based on the set of image processing operations, (ii) traversing up the render graph to define, for each of the plurality of objects in the scene, a pixel transform matrix that relates a particular object's object coordinate system to a pixel coordinate system, at least one of the pixel transform matrices embedding at least one perspective transform operation from the render graph, and (iii) traversing down the render graph to produce pixel data for each particular object in the plurality of objects using the particular object's pixel transform matrix.

19. The method of claim 18, wherein said rendering engine is further for specifying, at an output of the render graph, the pixel transform matrices as identity matrices in order to output the scene at a specified resolution.

20. The method of claim 18, wherein said rendering engine generates the render graph from a scene graph of the plurality of objects and the plurality of image processing operations.

21. The method of claim 18, wherein said rendering engine is further for rendering the scene by receiving at least one of (i) input pixel transform that specifies the resolution of the scene, (ii) a region of interest that specifies a particular area of the scene, (iii) a camera that defines the view of the scene, and (iv) a time that corresponds to a particular time when the scene is displayed.

22. The method of claim 18, wherein the plurality of objects are vector images, wherein the scene includes at least one raster image.

23. The method of claim 18, wherein the set of image processing operations includes perspective spatial transform operations and filtering operations.

* * * * *